A. B. BUTTERWORTH.
SCRUBBING MACHINE.
APPLICATION FILED OCT. 26, 1911.

1,020,125.

Patented Mar. 12, 1912

WITNESSES

INVENTOR
A. B. Butterworth
BY
ATTORNEY

UNITED STATES PATENT OFFICE.

ARTHUR B. BUTTERWORTH, OF SAN FRANCISCO, CALIFORNIA.

SCRUBBING-MACHINE.

1,020,125. Specification of Letters Patent. Patented Mar. 12, 1912.

Application filed October 26, 1911. Serial No. 656,828.

*To all whom it may concern:*

Be it known that I, ARTHUR B. BUTTERWORTH, a citizen of the United States, residing at San Francisco, in the county of San Francisco and State of California, have invented new and useful Improvements in Scrubbing-Machines, of which the following is a specification.

The object of the present invention is to provide a machine for scrubbing floors, and the like, which will be very effective for that purpose, notwithstanding any unevenness of the floor, and by which corners of the floor as well as the main portion thereof can be thoroughly scrubbed and cleaned.

Figure 1:
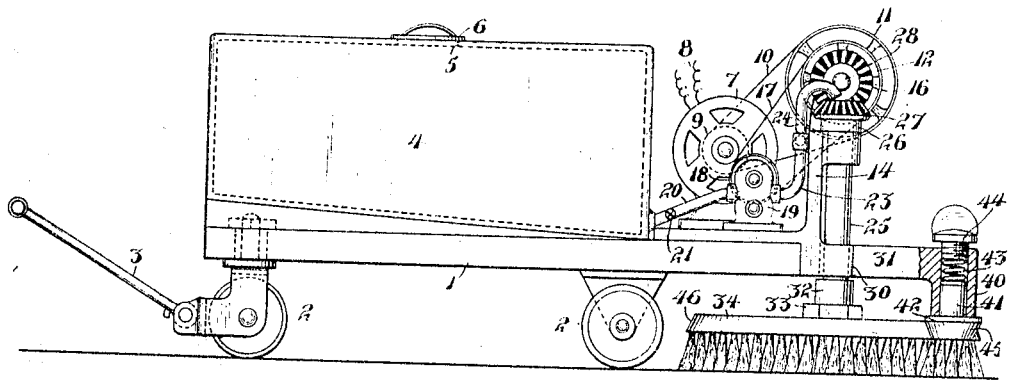
Figure 2:
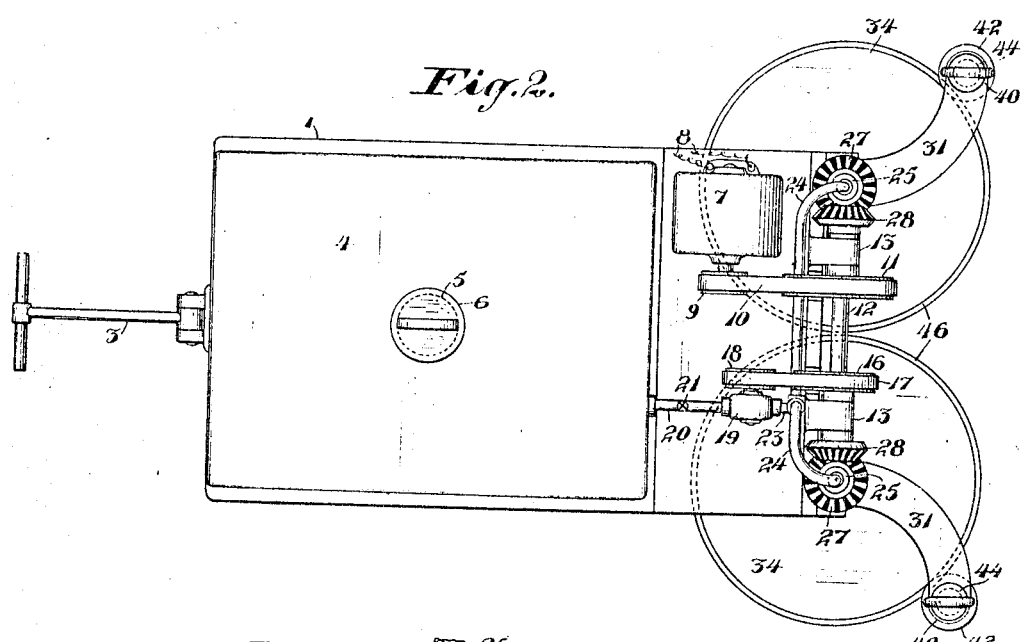
Figure 3:
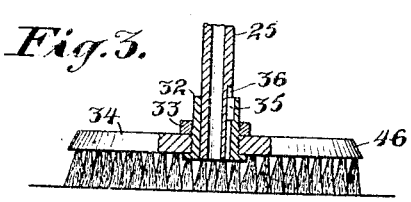

In the accompanying drawing, Figure 1 is a side view, partly in section, of my improved machine; Fig. 2 is a plan view thereof; Fig. 3 is a vertical sectional view through one of the main scrubbers.

Referring to the drawing, 1 indicates a truck mounted upon wheels 2, and having a handle 3 by which it can be propelled. Supported upon said truck is a water tank 4 in which, if desired, may be deposited through an opening 5 closed by a cover 6, any suitable liquid or solid cleansing material. Supported upon the forward end of the truck is an electric motor 7, supplied with current by flexible wires 8, and having on its shaft a pulley 9 driving, by means of a belt 10, a pulley 11 on a horizontal shaft 12 supported in bearings 13 on standards 14 secured to the truck. Also on said shaft 12 is secured a pulley 16 around which travels a belt 17, said belt also traveling around a pulley 18 on the shaft of a rotary pump 19 also mounted upon the forward part of the truck and connected to the tank by a pipe 20 controlled by a valve 21. Said pump delivers the liquid from the tank 4 to a pipe 23, which leads to two branch pipes 24, which discharge respectively into the upper ends of hollow vertical shafts 25, the upper ends of which are secured to collars 26 carrying bevel gear wheels 27 which mesh with bevel gear wheels 28 upon the ends of a horizontal shaft 12, so that said vertical shafts are rotated with the rotation of the horizontal shaft. Said hollow shafts pass through lower bearings or guides 30 in extensions 31, and upon the lower ends of said hollow shafts are mounted sleeves 32 to which are secured, by nuts 33, circular main scrubbing brushes 34. Said sleeves 32 are slidable upon said hollow shafts 25 but are rotatably connected thereto by means of splines 35 engaging grooves 36 in said shafts. Said extensions are forwardly and outwardly curved and the terminal portions thereof are extended downwardly to form cylindrical bearings 40 for shafts 41 and small auxiliary scrubbing brushes 42. In said bearings 40 are compressed coiled springs 43 pressing upon the upper ends of said shafts 41 and themselves being depressed by screws 44 screwed into the upper ends of said bearings, so that the pressure of the spring upon said brush can be adjusted as desired. The backs of said small brushes 42 have undercut beveled edges 45, and the extensions 31 are so formed that said beveled edges are in close contact with the upwardly tapering or beveled edges 46 of the backs of the main brushes 34. The coiled springs 43, constantly depressing the small brushes 42, maintain the edges of their backs in close contact with the edges of the backs of the main brushes notwithstanding any vertical movement of the main brushes, so that by frictional engagement with the main brushes, the small brushes are always rotated.

It will be seen that the small brushes 42 are arranged relatively to the main brush 34 so that the two external common tangents to these brushes meet at right angles. By providing, in connection with each main scrubbing brush, an auxiliary scrubbing brush in contact with the main brush, each brush being revoluble about a vertical axis, the auxiliary brush being of such diameter relatively to the diameter of the main brush, that the external common tangents to said brushes meet at right angles, I am able, by means of the scrubbing machine itself, to scrub practically the whole of the floor, leaving to be scrubbed by hand only a minute portion of each corner, between the circumference of the auxiliary brush and said corner.

It will be seen from Fig. 3 that liquid supplied to the upper end of each hollow shaft 25 is discharged into the center of the brush rotatably mounted thereon and is by said brush spread over the surface to be scrubbed, so that by the time it escapes from the operation of the brush it has been effectually used to remove the dirt from the floor.

While the slidable engagement of the main brushes 34 with the vertical shafts 25 enables said brushes to adjust themselves to any inequalities in the floor or other surface being scrubbed, the provision of the auxiliary brushes, located just beyond the periphery of the main brushes, enables the part of a floor extending in the corners or recesses of a room to be scrubbed and thoroughly cleansed.

I claim:—

In combination, a main scrubbing brush, an auxiliary scrubbing brush in contact with said main brush, both brushes being revoluble about a vertical axis, and means for revolving said brushes in unison, the diameter of the auxiliary brush being so related to the diameter of the main brush, that the two external common tangential vertical planes meet substantially at right angles.

In testimony whereof I have hereunto set my hand in the presence of two subscribing witnesses.

ARTHUR B. BUTTERWORTH.

Witnesses:
 FRANCIS M. WRIGHT,
 D. B. RICHARDS.